(12) United States Patent
Hern et al.

(10) Patent No.: US 6,767,860 B2
(45) Date of Patent: Jul. 27, 2004

(54) SUBLIMATION OF SOLID ORGANIC COMPOUNDS ONTO SUBSTRATE SURFACES IN THE PRESENCE OF A FLUID IMPREGNANT

(75) Inventors: Jamie A. Hern, Brockville (CA); Simon J. Smith, Glenburnie (CA)

(73) Assignee: 3M Innovative Properties Company, St. Paul, MN (US)

( * ) Notice: Subject to any disclaimer, the term of this patent is extended or adjusted under 35 U.S.C. 154(b) by 369 days.

(21) Appl. No.: 09/853,054

(22) Filed: May 10, 2001

(65) Prior Publication Data

US 2004/0127356 A1 Jul. 1, 2004

(51) Int. Cl.[7] .............................................. B01J 20/22
(52) U.S. Cl. ...................................... 502/401; 502/439
(58) Field of Search ................................. 502/401, 439

(56) References Cited

U.S. PATENT DOCUMENTS

| 1,519,470 A | 12/1924 | Wilson et al. |
| 1,781,664 A | 11/1930 | Rockwell |
| 2,400,709 A | 5/1946 | Patrick |
| 2,511,288 A | 6/1950 | Morrell et al. |
| 2,511,290 A | 6/1950 | Morrell et al. |
| 2,523,875 A | 9/1950 | Morrell et al. |
| 2,612,434 A | 9/1952 | Rockwell et al. |
| 2,818,323 A | 12/1957 | Haensel |

(List continued on next page.)

FOREIGN PATENT DOCUMENTS

| CZ | 149995 | 8/1973 |
| DE | 1098579 | 2/1961 |
| EP | 0143027 A1 | 5/1985 |
| EP | 0143027 B1 | 12/1986 |
| EP | 405 404 A1 | 1/1991 |
| EP | 0455173 | 11/1991 |
| EP | 0 370 141 B1 | 12/1994 |
| EP | 0 629 437 B1 | 12/1994 |
| FR | 1605363 | 2/1975 |
| GB | 1 123 822 | 8/1968 |
| GB | 2 187 725 A | 9/1987 |
| JP | 46-57554 | 3/1973 |
| WO | WO 81/02256 | 8/1981 |

OTHER PUBLICATIONS

Deitz et al., *Recovery of CK Efficiency of Whetlerites by CO Pretreatment–Role of TEDA and Surfactants*, Naval Research Laboratory, no date.
Maggs et al., *Enhancement of CK Protection By Use of Teda Impregnated Charcoal*, Chemical Defence Establishment Technical Paper No. 225, Jun. 1977.
Smith, Simon James, *Behaviour of Impregnated Activated Charcoal Cloth With Hydrogen Cyanide*, University of Manchester Thesis, Oct. 1982 to Sep. 1985.
*Military problems with Aerosols and Nonpersistent Gases*, National defense Research Committee, 1946, no month.
Chemsorb™ 620 product literature, no date.
*Defense Against Toxic Agents*, Chemicals In War, vol. 5, pp. 810–815, no date.
Grabenstetter, R.J. et al., *Impregnation of Charcoal*, Division 10 Report of US National defense Research Committee (1946) pp. 40–87, no month.

*Primary Examiner*—Stanley S. Silverman
*Assistant Examiner*—Edward M. Johnson
(74) *Attorney, Agent, or Firm*—David Kagan; Karl Hanson

(57) ABSTRACT

An approach for beneficially incorporating both a solid organic impregnant and a fluid impregnant into filter media particles without the presence or addition of one unduly affecting the performance of the other. The present invention achieves impregnation by combining sublimation and non-bulk absorption techniques. These techniques may be carried out in sequential, simultaneous, overlapping, and/or alternating fashion, or the like. The invention is especially suitable when the filter media particles already contain or are to contain one or more other impregnants, whose function or presence might be adversely affected when conventional methods are used to add the solid organic and fluid materials.

13 Claims, 1 Drawing Sheet

U.S. PATENT DOCUMENTS

| | | | |
|---|---|---|---|
| 2,920,050 | A | 1/1960 | Blacet et al. |
| 2,920,051 | A | 1/1960 | Wiig et al. |
| 2,963,441 | A | 12/1960 | Dolian et al. |
| 3,251,365 | A | 5/1966 | Keith II, et al. |
| 3,355,317 | A | 11/1967 | Keith II, et al. |
| 3,453,807 | A | 7/1969 | Taylor |
| 3,460,543 | A | 8/1969 | Keith II, et al. |
| 3,489,507 | A | 1/1970 | Gardner et al. |
| 3,491,031 | A | 1/1970 | Stoneburner |
| 3,532,637 | A | 10/1970 | Zeff et al. |
| 3,605,759 | A | 9/1971 | Owens, Jr. et al. |
| 3,618,295 | A | 11/1971 | Geiger et al. |
| 3,618,691 | A | 11/1971 | Honda |
| 3,739,550 | A | 6/1973 | Martin et al. |
| 3,796,023 | A | 3/1974 | Raduly |
| 3,901,818 | A | 8/1975 | Durand et al. |
| 3,935,294 | A | 1/1976 | Teller |
| 4,016,242 | A | 4/1977 | Deitz et al. |
| 4,022,223 | A | 5/1977 | Rainer et al. |
| 4,040,802 | A | 8/1977 | Deitz et al. |
| 4,070,300 | A | 1/1978 | Moroni et al. |
| 4,091,822 | A | 5/1978 | Ihrig et al. |
| 4,111,833 | A | 9/1978 | Evans |
| 4,204,980 | A | 5/1980 | Pasha et al. |
| 4,212,852 | A | 7/1980 | Aibe et al. |
| 4,222,892 | A | 9/1980 | Motojima et al. |
| 4,271,133 | A | 6/1981 | Tellis |
| 4,293,317 | A | 10/1981 | Kovach |
| 4,474,739 | A | 10/1984 | Zackay et al. |
| 4,531,953 | A | 7/1985 | Groose et al. |
| 4,594,231 | A | 6/1986 | Nishino et al. |
| 4,737,173 | A | 4/1988 | Kudirka et al. |
| 4,801,311 | A | 1/1989 | Tolles |
| 4,802,898 | A | 2/1989 | Tolles |
| 5,063,196 | A | 11/1991 | Doughty et al. |
| 5,145,820 | A | 9/1992 | Liang et al. |
| 5,462,908 | A * | 10/1995 | Liang et al. ............... 502/401 |
| 5,492,882 | A | 2/1996 | Doughty et al. |
| 5,792,720 | A | 8/1998 | Ro et al. |
| 5,952,092 | A * | 9/1999 | Groeger et al. ............ 428/323 |

* cited by examiner

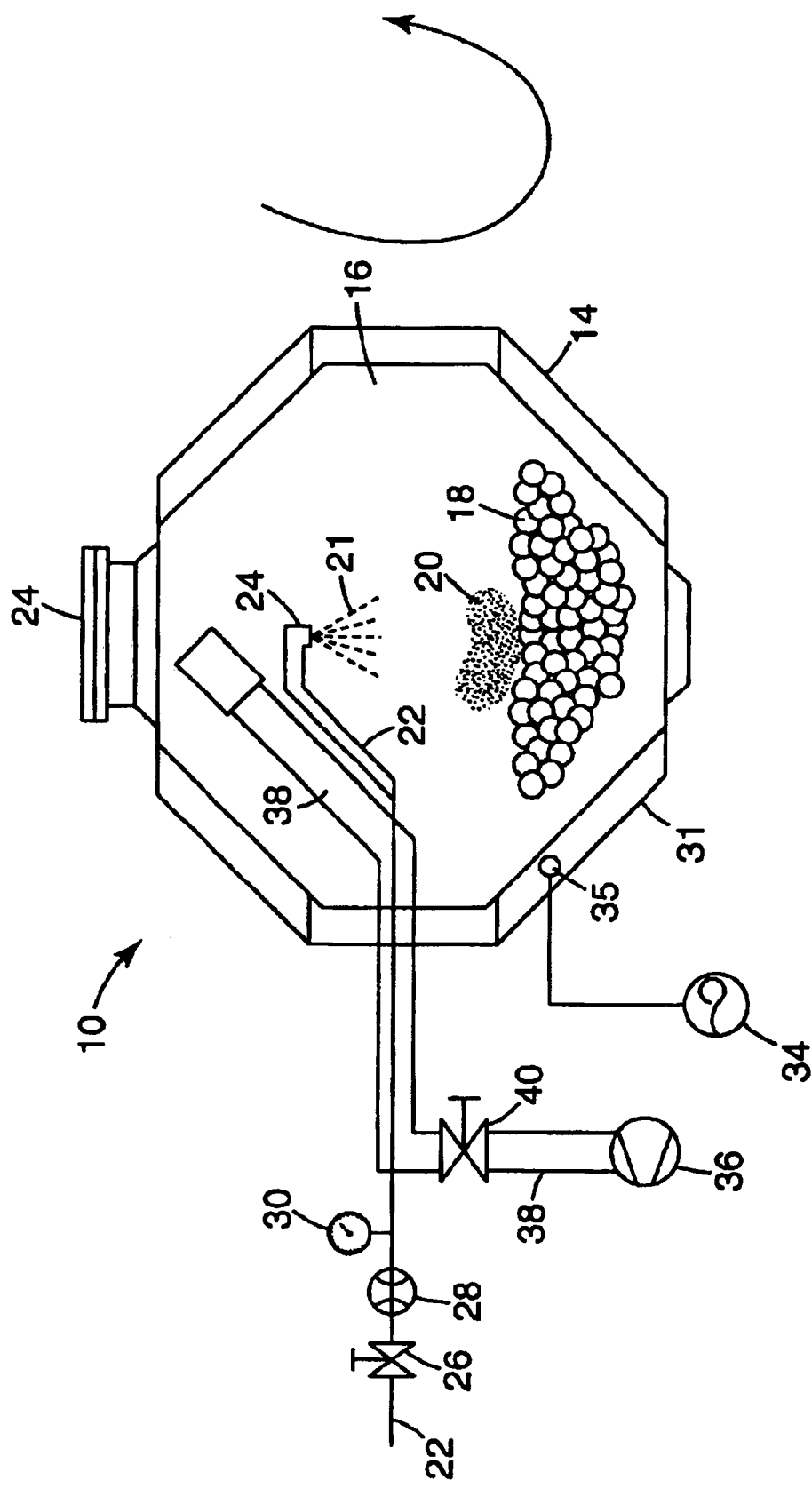

SUBLIMATION OF SOLID ORGANIC COMPOUNDS ONTO SUBSTRATE SURFACES IN THE PRESENCE OF A FLUID IMPREGNANT

FIELD OF THE INVENTION

This invention relates to filter media used to remove contaminants from air or other gases. More particularly, the invention relates to a method for impregnating a filter media where by at least one impregnate is deposited by sublimation and at least one other by non-bulk absorption in order to provide broad spectrum filtering performance.

BACKGROUND OF THE INVENTION

Extended surface area substrate particles, such as activated carbon, alumina, zeolites, and the like, are widely used in air filtration because of the ability of such materials to remove a wide range of different materials. The filtration characteristics of these materials arises from a highly porous or convoluted surface structure. In the case of activated carbon, the surface porosity results from controlled oxidation during the "activation" stage of manufacture. Activated carbon has been used for air filtration for many decades.

The ability of the carbon to remove a contaminant from the air by direct adsorption depends on a molecular-scale interaction between a gaseous molecule and the carbon surface. The extent of this interaction depends upon factors that include the physical and chemical surface characteristics of the carbon, the molecular shape and size of the gaseous compound, the concentration of the gaseous compound in the gas stream to be filtered, residence time in the carbon bed, temperature, pressure, and the presence of other chemicals. As a rule of thumb, for a single contaminant, the extent of adsorption is primarily dependent on boiling point. In general, the higher the boiling point, the greater the capacity of carbon to remove the chemical.

Accordingly, carbon does not have a great capacity by itself to remove lower boiling point gases. Treatments have been devised in which chemicals are coated on the carbon to provide filtering capabilities towards lower boiling point gases. These treatments are generally known as "impregnation" methods, and the result of treatment is an "impregnated" carbon.

Over the course of this century, development of impregnation techniques has progressed so that a variety of impregnants are available for removing a wide range of different chemicals. Progress has been accelerated during wartime, when actual and perceived threats spurred the development of specialized carbons. However, there has hitherto been a distinction between the types of filter media particles used for military applications, and those used in industrial applications. Military requirements have made it necessary for filter media particles to be capable of removing a range of chemicals, and so multi-component impregnation formulations have been devised. In industry, where the nature of hazards is known in advance, the practice has been to select a filter appropriate to the known hazard. Consequently, filters with capability toward a specific type of chemical or class of chemicals have developed for industrial applications.

Over time, regulatory structures for the selection and use of respiratory protective equipment have evolved, along with approvals systems to ensure that designs of equipment on the market are capable of meeting necessary performance requirements. Such approvals systems have been generated for industrial purposes across international boundaries. These include the European Norm system that is adopted widely in Europe and elsewhere in the world. Another example are the approvals requirements of the US National Institute for Occupational Safety and Health that have been adopted in the USA, Canada and certain other countries. For military requirements, performance specifications are determined by each national need, although there arc some internationally agreed upon standards under the North Atlantic Treaty Organisation.

The first U.S. patent for a treatment of carbon to remove a variety of military gases derived from developments to protect personnel in World War I battles in which chemical agents were used in excess. The patent by Joshua C. Whetzel and R. E. Wilson (U.S. Pat. No. 1,519,470, 1924) described the use of an ammoniacal solution of copper carbonate to impregnate a granular activated carbon. This technique became known as "Whetlerization", and the carbon product "Whetlerite". Variations on this technique have been developed over time. (U.S. Pat. No. 2,902,050, U.S. Pat. No. 2,902,051, DE 1,098,579, FR 1,605,363, JP 7384,984, CZ 149,995).

During World War II substantial technical investigations were made into the use of impregnated carbons. The U.S. research in this area is summarized in "Military Problems with Aerosols and Nonpersistent Gases", Chapter 4: "Impregnation of Charcoal", by Grabenstetter, R. J., and Blacet, F. E., Division 10 Report of US National Defense Research Committee (1946) pp.40–87. This report provides in depth coverage of a number of impregnant formulations.

The United Kingdom pursued a slightly different impregnation approach. There, copper oxide was mixed with coal prior to carbonization and activation, so that the activated carbon contained metallic copper distributed throughout its structure. This material was the basis for the filter carbons used in World War II.

The ability of the carbon to remove cyanogen chloride (CK) was improved by the application of the amine pyridine or, separately, by impregnation with chromium in the form of sodium dichromate. This form of carbon, in combination with a pyridine impregnant, was used in military respirator filters manufactured in the 1970s.

Post World War II research has explored how the addition of organic compounds to impregnated carbon could improve the shelf life. Experiments were undertaken in the UK, France and elsewhere with various amines. One such material found to improve the shelf life towards cyanogen chloride is triethylenediamine (also known as TEDA or 1,4-diazabicyclo-[2.2.2]-octane). When impregnated on carbon, TEDA has been found in its own right to be capable of reacting directly with cyanogen chloride and is also highly capable of removing methyl bromide and methyl iodide. TEDA is strongly adsorbed onto carbon, is stable, is effective at low levels, and has minimal toxicity compared with other amine compounds. TEDA is a solid at room temperature, but sublimes readily.

Chromium has traditionally been used as a carbon impregnant in military applications, as it facilitates the satisfactory removal of hydrogen cyanide and cyanogen chloride (CK). Because the hexavalent ionic form of chromium has been identified as a potential lung carcinogen, work undertaken in recent times and dating back to the early 1970's has explored formulations that avoid or reduce the level of chromate salts as impregnants.

In recent times, the traditional role of military forces has changed from a more or less predictable battlefield conflict to encompass peace-making and peace-keeping roles, and supporting civilian authorities in emergency response. Such activities may involve responding to the release of chemicals by accident or intent. Intentional release of chemicals, referred to as "chemical terrorism", has occurred in fact and been threatened numerous times. These incidents may involve chemicals that have been traditionally regarded as military threats or may involve hazardous chemicals normally used in industry. The response to these hazards is ultimately likely to involve both civilian and military authorities and is likely to require protection systems that meet industrial approvals as well as military performance requirements.

Filtration-based protection systems are appropriate for personnel undertaking various tasks at some distance from a point of chemical release. For such cases, it is most desirable to be able to respond to a hazard quickly and without delay. Conventionally, however, delay may be inevitable as it may be necessary to first identify a threat in order to select an appropriate filter. In order to be able to respond to a wide range of possible hazards, it has been necessary to carry inventories of many different kinds of filters. It would be much more desirable to have one filter type that can provide protection against many different hazards. Such a multi-purpose filter desirably would accommodate both industrial and military needs.

U.S. Pat. No. 4,531,953 describes a method by which an amine such as TEDA is added to carbon via sublimation. The method must occur in the absence of added water. Otherwise, the patent indicates that the water would use up the adsorption capacity of the carbon, limiting the amount of amine that could be adsorbed. Unfortunately, this approach provides impregnated carbons with reduced moisture content. Because water can help filter acid gases, this impairs protection against acid gases.

Thus, contrary to the teachings of U.S. Pat. No. 4,531,953, it is often desirable to include or enhance the moisture content of filter media particles for acid gas protection. However, adding or maintaining moisture causes problems. As noted in U.S. Pat. No. 4,531,953, water could occupy valuable absorption capacity of the particles.

Additionally, because many effective impregnants (e.g., amines, metal salts, etc.) are water soluble, conventional methods for adding water can wash away impregnants from filter media particles.

Clearly there is a need for incorporating both solid organic impregnants (such as TEDA) and a fluid impregnant (such as water) onto carbons without unduly compromising filtering performance.

SUMMARY OF THE INVENTION

The present invention provides an approach for beneficially incorporating both a solid organic impregnant and a fluid impregnant into filter media particles without the presence or addition of one unduly affecting the performance of the other. The present invention achieves impregnation by combining sublimation and non-bulk absorption techniques. These techniques may be carried out in sequential, simultaneous, overlapping, and/or alternating fashion, or the like. The invention is especially suitable when the filter media particles already contain or are to contain one or more other impregnants, whose function or presence might be adversely affected when conventional methods are used to add the solid organic and fluid materials. For example, if any of the impregnants are water soluble materials (such as some amines and most metal salts), trying to add water to the particles via immersive contact with an aqueous liquid can wash the water soluble materials away. The present invention substantially avoids this problem.

Accordingly, it can be appreciated that the present invention is particularly useful when it is desired to increase the water content of filter media particles to achieve enhanced acid gas protection. The present invention is advantageously practiced in connection with filter media whose performance is enhanced by multiple impregnants. In particularly preferred embodiments, the present invention may be advantageously used to incorporate both a solid amine such as TEDA and a solvent such as water onto filter media particles.

As an overview of a preferred methodology, the filter media particles to be impregnated are placed into a suitable processing vessel along with the desired amount of solid, organic compound(s). Processing is carried out under conditions effective to allow the solid organic compound to sublime and impregnate the filter media particles. During at least one or more portions of the sublimation, the desired fluid impregnant is introduced into the vessel so as to prevent bulk absorption by the filter media particles so that at least one or more portions of the sublimation is carried out in the presence of the fluid. Preferably, the fluid is introduced as a vapor (steam in the case of water) or as atomized droplets, streams, mist or fog via suitable nozzle structure(s) to prevent bulk absorption conditions. Advantageously, this methodology allows both kinds of materials to be incorporated into filter media particles without the addition or presence of one of the materials unduly compromising the performance of the other. As an additional advantage, preferred embodiments of the invention produce substantially no waste as all input materials are quantitatively included in the finished composition.

In contrast to the practice of the present invention, "bulk absorption" or "immersive contact" of a fluid impregnant refers to contact in which the particles to be impregnated are caused to directly contact a liquid bath comprising the fluid impregnant. In a preferred sense, bulk absorption by a porous solid material is characterized by the penetration of a liquid into a solids porous matrix under conditions in which the outer surface(s) of the solid are in communication with a large reservoir of liquid that has a volume in excess to the air displaced from the solid during absorption. Bulk absorption can occur via penetration absorption and/or immersional absorption mechanisms. With penetration absorption, bulk liquid penetrates a solid matrix from one side and displaces air from the solid through the open spaces in the matrix as the liquid front moves through the matrix. In a penetration absorption mechanism, free liquid is present even after the fill saturation of the solid. Immersional absorption occurs when a porous mass is totally immersed in a bulk liquid and the liquid penetrates into the solid generally from all directions.

In the practice of the present invention, "non-bulk contact" or "non-immersive contact" means that the fluid is caused to impregnatingly contact the particles in a form other than via bulk absorptionIn a preferred sense, the absorption impregnation conditions of the invention would include mechanisms such as capillary condensation and liquid thread motion. In capillary condensation, vapor is condensed into the pores or crevices within a porous solid. Absorption by liquid thread motion would occur when a droplet of liquid contacts the outer surface of the solid, wets its surface an is drawn into the porous volume.

Examples of non-bulk contact, or non-imnmersive contact, include causing the fluid to contact the particles as a vapor, gas, one or more streams, droplets, mist, fog, combinations of these, or the like. In preferred embodiments, the amount of fluid caused to contact the particles in a non-bulk contact is substantially equal to the amount of the fluid that is desired to be absorbed onto the particles. Advantageously, this significantly reduces, or even eliminates, any waste associated with the impregnation process. In this context, "substantially equal" means that the amount of fluid is within 20%, preferably 10%, more preferably 1% of the desired absorption amount. For example, if 100 parts by weight of particles are to be impregnated with 2% by weight of the fluid, then generally about 1.5 to 2.5 parts by weight of the fluid would be caused to contact the particles via non-bulk contact.

In one aspect, the present invention relates to a method of making a filter medium. At least one solid, organic compound is caused to sublime onto the extended surface area of a plurality of filter media particles. During at least a portion of the sublimation, a fluid impregnant is caused to be absorbed by the filter media particles via non-bulk contact In another aspect, the present invention relates to a method of making a filter medium. A plurality of filter media particles is intermixed with a plurality of solid amine particles to form a solid mixture. The solid mixture is heated under conditions effective to cause at least a portion of the amine to sublime onto the filter media particles. While heating the solid mixture, the particles are non-immersively contacted with a fluid impregnant to achieve non-bulk absorption of at least a portion of the fluid by the particles.

BRIEF DESCRIPTION OF THE DRAWINGS

The above mentioned and other advantages of the present invention, and the manner of attaining them, will become more apparent and the invention itself will be better understood by reference to the following description of the embodiments of the invention taken in conjunction with the accompanying drawings, wherein:

FIG. 1 is a schematic illustration of a system for making filter media in accordance with the practice of the present invention.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

For purposes of illustration, the present invention will now be described in connection with a preferred apparatus 10 schematically shown in FIG. 1. Apparatus 10 includes rotating vessel 14 having interior 16. One or more kinds of filter particles 18 to be impregnated and one or more solid organic compound(s) 20 are positioned inside vessel 14. Fluid supply line 22 provides a fluid 21, (gas, vapor, and/or liquid) into rotating vessel 14 through one or more outlet(s) 24. If the fluid includes a liquid, outlets 24 are generally in the form of nozzles that stream, atomize, mist, or otherwise fog the liquid into vessel 14. Valve 26 may be used to control the flow rate of fluid into interior 16. When the fluid includes a liquid, the flow rate through supply line 22 may be measured using a suitable measuring device such as flow meter 28. When the fluid includes a gas or vapor, pressure gauge 30 or other suitable measuring device may be used to monitor the fluid in supply line 22.

One or more temperature control units 31 may be thermally coupled to vessel 14 to allow processing to be carried out at temperatures above or below ambient, as desired. Temperature sensing system 34 allows the temperature inside vessel 14 to be monitored. In one representative embodiment, system 34 senses temperature using a thermocouple 35. System 34 and temperature control unit 31 may be operationally coupled to a suitable control system (not shown) to allow the temperature of interior 16 to be controlled. Typical control methodologies may use feedback and/or feedforward techniques.

Vacuum generating system preferably in the form of a vacuum pump 36 is coupled to interior 16 via vacuum line 38. Valve 40 is used to controllably open and close line 38. In some modes of operation, vacuum pump 36 may be used during one or more portions of processing in order to lower the pressure of interior 16 to enhance the sublimation rate of organic solid compound 20.

In a particularly preferred mode of operation, one or more kinds of filter media particles 18 and one or more solid organic compounds 20 are placed into interior 16. The filter media particles 18 may independently include one or more impregnants (described further below) incorporated onto one or more extended surface area substrate particles. The term "extended surface area substrate particles" means particles in which the surface is sufficiently convoluted or porous, preferably at a microscopic level, such that the particles are capable of being impregnated with at least 5%, more preferably at least 10% by weight of a $CuCl_2$ salt. Suitable extended surface area substrate particles tend to have specific surface areas of at least about 85 $m^2/g$, more typically at least about 500 $m^2/g$ to 2000 $m^2/g$, and preferably about 900 $m^2/g$ to about 1500 $m^2/g$. In the practice of the present invention, specific surface area may be determined by the BET nitrogen isotherm test method. Representative examples of extended surface area substrate particles include activated carbon, zeolite, alumina, silica, catalyst supports, combinations of these, and the like.

The extended surface area substrate particles may have any of a wide range of sizes. Substrate particle size in the filter industry generally is expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Filter media particles 18 characterized by a mesh size of 12×30 would include a population of particles having a diameter in the range from about 0.5 mm to about 1.5 mm.

Selecting an appropriate mesh size for the substrate particles involves balancing density and filter capacity against air flow resistance. Generally, a finer mesh size (e.g., smaller particles) tends to provide not only greater density and filter capacity, but higher air flow resistance. Balancing these concerns, "a" is typically in the range of 5 to 20 and "b" is typically 15 to about 40 with the proviso that the difference between a and b is generally in the range from about 5 to about 30. Specific mesh sizes found to be suitable in the practice of the present invention include 12×20, 12×30, and 12×40.

The substrate particles desirably incorporate at least one impregnant comprising at least one transition metal.

Examples of such impregnant materials include compounds containing Cu, Zn, Mo, Cr, Ag, Ni, V, W, Co, combinations thereof, and the like. However, because the hexavalent form of Cr has been identified as a potential carcinogen, the first plurality of filter media particles preferably includes no detectable amounts of Cr (VI), and more preferably no detectable Cr of any valence state due to the risk that other forms of Cr, e.g., Cr(IV) could be oxidized to Cr(VI). The metals may be in metallic form, but more typically are impregnated as salts.

The selection of which one or more transition metal compounds to incorporate into the plurality of filter media particles 18 depends upon the desired range of filtering capabilities inasmuch as each of the various transition metals tend to provide protection against particular air contaminants. For example, Cr, Mo, V, and Y or W independently help to filter gases such as cyanogen chloride and hydrogen cyanide from air streams when used in combination with a Cu impregnant. Representative filter media particles may include 0.1 to 10 weight percent of one or more impregnants including Mo, V, W, and/or Cr. Due to the potential toxicity of Cr, the use of Mo, V, and/or W materials are preferred. Throughout this specification and accompanying claims, weight percent is based upon the total weight of the impregnated particles.

Cu tends to help filter many gases such as HCN, $H_2S$, acid gases, and the like from air streams. Representative filter media particles 18 may include 0.1 to 15 weight percent of one or more impregnants including Cu.

Zn in various forms tends to help filter HCN, cyanogen chloride, cyanogen, and $NH_3$ from air streams. Representative filter media particles 18 of the present invention may include 1 to 20 weight percent of one or more impregnants including Zn.

Ag tends to help filter arsenical gases from an air stream. Ag functions catalytically and generally is not consumed during filtering operations. Accordingly, filter media particles 18 may include relatively small catalytic amounts, e.g., about 0.01 to 1, preferably 0.1 weight percent, of one or more Ag-containing impregnants.

Ni and Co each independently helps to filter HCN from air streams.

Representative filter media particles 18 may include 0.1 to 15 weight percent of one or more Ni containing impregnants and/or Co containing impregnants.

In addition to transition metals, the particles 18 may optionally include one or more other kinds of impregnants. For example, ammonia or ammonium salts in the impregnating solution not only help to improve the solubility of transition metal compounds during the manufacture of the particles, but remaining adsorbed quantities also help to remove acid gases from air streams. Sulfate salts are believed to help to control the pH during usage of filter media. Ammonium sulfate, for instance, when impregnated on a substrate such as carbon and dried at 145° C. forms an acid sulfate. Acid sulfate is sufficiently acidic to react with ammonia to facilitate removal of ammonia from a flow of air or other gas. Through impregnation and drying, strongly acidic ammonium salts impregnate the carbon during the drying process without damaging the basic oxide/hydroxide impregnant being formed. This results in enhanced ammonia service life of a cartridge containing the resultant impregnated carbon. Representative filter media particles 18 may include 0.1 to 10, preferably 2.5 to 4.5 weight percent of sulfate. Moisture beneficially helps to remove acid gases from air streams. Optionally, therefore, the plurality of filter media particles 18 may include up to about 15 weight percent, preferably about 6 to 12 weight percent of water.

Other than the solid organic compound(s) 20 and fluid(s) 21 to be added via sublimation and non-bulk contact as described herein, other impregnants may be incorporated into the particles 18 in accordance with conventional practices. Such impregnants are typically provided as salts, oxides, carbonates, or the like and are impregnated via solution processing, sublimation processing, fluidized bed processing, and the like. Representative techniques for such processing have been widely described in the literature, including the patent and literature documents cited in the Background section herein.

For broad spectrum filtering performance particularly preferred filter media particles 18 comprise an activated carbon substrate impregnated with 6 to 13 weight percent of a Cu containing impregnant, 0 to 10 weight percent of a Zn containing impregnant, and 1 to 4 weight percent of a Mo containing impregnant. Particularly preferred filter media particles further comprise not only Cu, Zn and Mo containing impregnants but also one or more of 2.5 to 4.5 weight percent sulfate salt, and/or 1 to 25 weight percent water. Such filter media particles are described in U.S. Pat. No. 5,492,882. A specific embodiment of such particles is commercially available under the trade designation "Calgon URC" from Calgon Carbon Corporation.

Preferred solid organic compound(s) 20 preferably include solids having a vapor pressure in the solid state at the desired processing temperature and pressure such that the compound will sublime in a reasonable time, e.g., 10 seconds to 72 hours, preferably 12 to 30 hours. It is also preferred that the compound(s) 20 exist as solids at 25° C. and 1 atm. Particularly preferred solid organic compounds 20 generally comprise amines that may include one or more primary, secondary, and/or tertiary amine moieties.

Generally, amines help to provide protection against CK, methyl bromide, and/or methyl iodide. Preferred amines are either a solid or liquid at room temperature. Representative examples of suitable amines include triethylenediamine (TEDA), piperazine, triethylamine (TEA), pyridine, pyridine-4-carboxylic acid (P4CA), combinations of these, and the like. Of these, preferred amines include TEDA and piperazine, used singly or in combination with each other or other amines. When used in combination with each other, the weight ratio of TEDA to piperazine may be in the range of 1:20 to 20:1. Commercially available TEDA is normally supplied as fine granular crystals, but the material is hygroscopic, and tends to clump and or form a hard mass of crystals on storage. For this reason the material preferably is subjected to light grinding to regenerate the fine crystalline form before adding it to interior 16 of vessel 14. If this grinding is not performed, the surface area to mass of crystals is lower than if it is ground to a fine crystalline form. This impacts the length of time necessary to complete the process. Larger crystals or lumps require a longer process time.

The amount of solid organic compound 20 relative to the amount of filter media particles 18 may vary within a wide range. Generally, in the case of amines, if too little is used, the CK lifetime of the resultant media may be below what is desired. Additionally, if too little amine is used, a synergistic boost in filtering capabilities (e.g., organic vapor, CK, and ammonia lifetime), may not be observed when used in combination with other kinds of particles. On the other hand, using too much amine may tend to unduly degrade the capacity of the filter media particles 18 to remove organic vapors from air or other gases. Additionally, above some impregnation level, little additional benefit may be observed by the use of more amine. Balancing these concerns, the weight ratio of the solid organic compound 20 to the filter media particles 18 is desirably in the range from about 0.1:100 to 10:100, more preferably 1:100 to 5: 100.

Other than water, other fluid impregnants may also be advantageously non-bulk contacted with the particles in accordance with the present invention. Representative examples include alcohols, amines, organic acids, combinations of these, and the like.

In the preferred mode of practice, after the filter particles 18 and the solid organic compound 20 are placed into interior 16 of vessel 14, vessel 14 is then closed and desirably rotated or otherwise agitated at a speed that facilitates intimate mixing of the two materials. The intimate mixing favorably reduces process time in that sublimation and impregnation occurs in less time when the particles are thoroughly mixed. For a 218 liter-sized vessel containing 50 kilograms of activated carbon filter media particles and 0.76 kilograms of solid TEDA organic compound, a rotational speed of 5.6 to 11 rpm, preferably 10 rpm would be suitable. Interior 16 preferably is at about room temperature during such mixing. Typically, this mixing occurs for a time period in the range of 1 to 20 minutes, more preferably 5 to 10 minutes.

After mixing is complete, the rotational speed of vessel 14 is slowed to a speed of 5.6 to 11 rpm, most preferably about 5.6 rpm and the temperature is raised to an elevated temperature to facilitate sublimation of the solid organic compound and adsorption of the fluid. The temperature may be selected as appropriate to the characteristics of the particles 18, the organic compound being used, and the fluid being used. Practical concerns, however, limit the range within which a suitable elevated temperature may be selected. For example, in those embodiments in which the particles 18 include activated carbon, the oxidizable characteristics of activated carbon impose one upper limit upon temperature. Specifically, the temperature generally should not be raised to a point at which there is a risk of ignition or self-heating of the carbon. Typically, such an upper limit is about 150° C. Additionally, as another practical limit, the temperature is desirably below the melting point of the solid organic compound 20. In particularly preferred embodiments of the invention in which the solid organic compound is TEDA and the fluid is water, a preferred elevated temperature is 50° C.

The fluid 21 desirably is introduced to interior 16 very soon, and preferably substantially immediately following sealing and heating of the vessel 14 to the desired elevated temperature. Thus, it can be appreciated that the fluid 21 is therefore added while sublimation is being carried out. During the period(s) in which fluid 21 is introduced, to vessel 14, the process vessel continues to be rotated to allow uniform distribution of the fluid 21 to all the particles 18 in the vessel interior 16.

A sufficient quantity of the fluid 21 is added to increase the moisture content of the activated carbon by a desired amount, such as 0.05 to 2 percent, more preferably 0.5 percent based upon the total weight of the impregnated particles. The fluid 21 is supplied to the process vessel 14 in a controlled manner to ensure that the fluid 21 contacts the particles 16 in non-bulk fashion. Preferably the desired amount of the fluid 21 is introduced to the process at a rate which does not soak or fully wet the carbon, but rather increases the moisture content by adsorption of the water in the activated carbon micropore structure. Preferably, fluid addition occurs over a period spanning 1 minute to 72 hours, more preferably 15 to 80 minutes, most preferably 20 to 40 minutes. The flow may be continuous or intermittent during this period. For instance, there is a practical minimum flow rate that can be attained by commercially available spray nozzles. Accordingly, for small batches of materials being processed, the fluid 21 may be introduced into interior 16 in an intermittent flow pattern if necessary to achieve a longer addition time.

Preferably, the fluid 21 is introduced as a vapor or gas (e.g., steam in the case of water) or as an atomized mist or fog to facilitate the desired non-bulk contact with the particles. For atomization, the liquid generally is sprayed into vessel 14 through a suitable atomizing spray nozzle that is selected to provide a delivery rate appropriate to the size of the process vessel and weight of particles 18 being treated. Preferred nozzles are conventionally known as "fogging" or "atomizing" nozzles. Preferably, fluid 21 is water introduced as steam or an atomized mist or fog.

Rotation of vessel 14 is halted at the end of fluid addition. This avoids undesired grinding and possible change in mesh size distribution of the filter media particles 18. At this time, the air or other gas in vessel interior 16 preferably is evacuated from the vessel by vacuum pump 36. The vessel 14 is evacuated to any desired reduced pressure such as 0.01 atm to about 1 atm, preferably 0.05 atm to 0.5 atm, more preferably about 0.1 atm. The reduced pressure facilitates and enhances the rate of sublimation of the organic compound 20.

When the desired vacuum is achieved, the process vessel 14 is sealed by closing valves 26 and 40 and left at reduced pressure for a period of time. Pump 36 is desirably shut off. Otherwise, if the vacuum pump 36 were to continue to run and pull a vacuum, sublimed material in the vapour phase might be evacuated from vessel 14, reducing the ultimate loading of the material on the particles 18. The vessel 14 is left sealed for a time period long enough for the desired amount of sublimation to occur. Preferably, this time period is long enough for at least substantially complete adsorption or other incorporation of all of the organic solid 20 and fluid 21 onto the particles 18. Typically, this period may range from 1 minute to 72 hours, preferably 2 hours to 48 hours, more preferably about 24 hours.

Of course, the process can also be successfully completed without the use of reduced pressure. For example, if the temperature is elevated but pressure is ambient atmospheric pressure, the process outcome is not changed. However, the ambient pressure process may require a longer time for completion.

After impregnation is complete, the vessel 14 is cooled or allowed to cool to ambient or close to ambient temperature, and the resultant impregnated material is removed for incorporation into suitable products and/or storage containers.

When this process is carried out using TEDA in the presence of steam or a sprayed mist of water, the presence of the water ensures that the particles 18 include not just TEDA, but also a desired moisture content. Otherwise, if water is not present in one form or other, sublimation causes water loss. If the particles 18 lose water content, the level of protection against acid contaminants could be reduced. Indeed, sublimation in the presence of the water actually causes the water content of the processed particles 18 to be greater than that of the starting particles 18. For instance, as supplied by the vendor, CALGON URC has a moisture content of 5% to 6% by weight. After steam sublimation, the moisture content is 7% to 9%.

Fog sublimation increases moisture content to 7% to 9%.

The resultant processed particles 18 can be evaluated by measuring the composition of the finished product, or by measuring a functional performance characteristic. Composition measurements include moisture content and TEDA content. Moisture can be measure by xylene extraction according to ASTM method D 2867, alternatively by moisture balance. TEDA content can be determined by extraction and gravimetric analysis.

Functional performance measurements are accomplished by building a filtering device containing a bed of the product activated carbon. The filter is tested in a system that generates a constantly flowing stream of humid air under controlled temperature and humidity conditions. A contaminant is metered into the stream to generate a constant, known concentration. The airstream containing the contaminant is passed through the filter, which is mounted in a chamber. An analyzer of a type appropriate to the contaminant being tested is used to monitor the concentration of the contaminant in the effluent air, downstream of the filter. The time taken for the concentration of test agent in the effluent to reach a prescribed value is measured. By using a standard test condition and uniform filter design, the functional performance of product carbons can be compared. In addition, the filters can be evaluated with respect to industrial and military filter performance standards for respirator filters as a functional performance measurement.

The present invention will now be further illustrated in connection with the following illustrative examples.

Test Methods

Test Method 1—Moisture Measurement: Moisture can be measured by the procedures prescribed by ASTM method D 2867 Standard Test Method for Moisture in Activated Carbon, Xylene Method. Published by the American Society for Testing and Materials (ASTM), West Conshohocken, Pa., U.S.A.

Test Method 2—Cyanogen Chloride Sorption: Adsorption performance of an impregnated carbon for the compound cyanogen chloride was determined by the method described in United States Military Specification MIL-PRF-51560 Section 4.4.6.5 Gas Life and Table V Conditions for gas life testing. The sample filters containing an impregnated carbon were pre-humidified to constant weight uptake at 80% relative humidity. They were then tested in a system that generated a cyclical flowing stream of humid air under controlled temperature and humidity conditions. The cyclical flow simulated human breathing, and had a mean flow rate of 32 liters per minute, 26±3° C., and 80±3% relative humidity. Cyanogen chloride was metered into the stream to generate a concentration of 4000±200 mg/m$^3$. The airstream containing the cyanogen chloride was passed through the filter, which was mounted in a chamber. An analyzer of a type appropriate to the contaminant being tested was used to monitor the concentration of the contaminant in the effluent air, downstream of the filter. The time needed to attain an effluent concentration of 8.0 mg/m$^3$ was measured.

Test Method 3—Carbon Tetrachloride Sorption: For carbon tetrachloride, Organic Vapor Test Procedure, N. Bollinger and C. Coffey, National Institute for Occupational Safety and Health (NIOSH), Morgantown, W.Va., U.S.A., for organic vapor cartridges was used. The sample filters containing an impregnated carbon were tested in a system that generated a constant flowing stream of humid air under controlled temperature and humidity conditions. Carbon tetrachloride was metered into the stream to generate a concentration of 1000 parts per million. The airstream containing the carbon tetrachloride was passed through the filter, which was mounted in a chamber. An analyzer of a type appropriate to the contaminant being tested was used to monitor the concentration of the contaminant in the effluent air, downstream of the filter. The time needed to attain an effluent concentration of 5 parts per million was measured. Some samples were pre-humidified for six hours at a flow rate of 25 liters per minute and relative humidity of 85%. The test flow rate was 32 liters per minute, 25±2.5° C., and 50±5% relative humidity. Other samples, denoted NOT PREHUMIDIFIED in the test results, were tested at 64 liters per minute, 25±2.5° C., and 50±5% relative humidity.

Test Method 4—Sulfur Dioxide Sorption. For sulfur dioxide, the NIOSH procedure Sulfur Dioxide Test Procedure, N. Bollinger and C. Coffey, NIOSH, Morgantown, W.Va., U.S.A. was used. The general test conditions were the same as Method 3 with the exception that 500 parts per million sulfur dioxide at a flow rate of 64 liters per minute was used, and the filters were tested with no pre humidification. The time required to attain an effluent concentration of 5 parts per million was measured.

Test Method 5—Ammonia Sorption. For ammonia, the NIOSH procedure Ammonia and Methylamine Test Procedure was used. The general test conditions were the same as Method 4 with the exception that 1000 parts per million ammonia at a flow rate of 64 liters per minute was used. The time required to attain an effluent concentration of 50 parts per million was measured.

EXAMPLE 1

Impregnated carbon was produced through the method of the invention by controlling the atmosphere in a sealed vessel into which was charged activated carbon, granulated TEDA, and water. The vessel used in the Example was a 7.7 cubic foot (218 liter), conical rotary drum type that could be heated and evacuated during processing. The vessel, available from Paul O. Abbé Incorporated, Little Falls, N.J., U.S.A. type 30 Rota-Cone Vacuum Dryer 1 was adapted so that water could be introduced as a finely atomized, fog-like spray during processing. The process, however, can be conducted in vessels larger or smaller than this, as desired. For example, similar equipment with internal diameters ranging from 12 to greater than 96 inches are available from this same vendor.

To begin the impregnation, 26.3 kg of activated carbon type URC 12×30 available from Calgon Carbon Corporation, Pittsburgh, Pa., U.S.A. and 0.4 kg of triethylene diamine, 98% (TEDA) supplied by Aldrich Chernical Company, Milwaukee, Wis., U.S.A. were charged into the vessel. TEDA was ground to a fine powder prior to addition to the vessel to assure even distribution during processing. With both the activated carbon and TEDA charged into the vessel it was closed, sealed, and rotated at a speed of 10 rpm for 5 minutes. The temperature of the vessel was set to 50° C. and the rotation speed was reduced to 5.6 rpm. While the contents were tumbled, 131.5 g of deionized water was introduced into the vessel at a rate of 0.7 grams/second by way of a pressurized delivery line attached to an internal spray nozzle. The flow was halted intermittently such that the total spray time was 30 minutes. The spray nozzle positioned inside the vessel produced a fine water mist that impregnated the carbon during processing. Rotation of the vessel was stopped after the desired amount of water had been introduced, at which point, the atmosphere in the vessel was evacuated to an internal pressure of approximately 10.1 kPa with the aid of a vacuum pump. The vessel was maintained at a temperature of 50° C. for 24 hours. After the designated time the vessel was cooled to room temperature and the impregnated carbon removed.

Samples of the impregnated carbon were evaluated for moisture content and gas adsorption performance. Moisture content was determined with Test Method 1. Samples of the impregnated carbon were loaded into a respirator filter, and performance against cyanogen chloride was determined by Test Method 2. Adsorption performance of an impregnated carbon for the compounds carbon tetrachloride, ammonia, and sulfur dioxide were determined by using NIOSH respirator certification tests as required in the Code of Federal Regulations, Chapter 42 Part 84 Approval of Respiratory Protective Devices, for negative pressure respirator cartridges using Test Methods 3, 4, and 5. Results are given in Tables 1 and 2.

EXAMPLE 2

Impregnated carbon was produced through the method of the invention by passing humidified air through a vessel into which was charged activated carbon and granulated TEDA. The vessel used in the Example was a 0.5 cubic foot (14 liter), conical rotary drum type that could be heated and evacuated during processing. The vessel, available from Paul O. Abbé Incorporated, Little Falls, N.J., U.S.A. type 12 Rota-Cone Vacuum Dryer was adapted so that water vapor could be introduced in a humid air stream during processing. To begin the impregnation, 2.0 kg of activated carbon type URC 12×30 available from Calgon Carbon Corporation, Pittsburgh, Pa., U.S.A. and 31.2 grams of triethylene diamine, 98% (TEDA) supplied by Aldrich Chemical Company, Milwaukee, Wis., U.S.A. were charged into the vessel. TEDA was ground to a fine powder prior to addition to the vessel to assure even distribution during processing. With both the activated carbon and TEDA charged into the vessel it was closed, sealed, the temperature of the vessel was set to 22° C. and it was rotated at a speed of approximately 6 rpm for 5 minutes. While the contents were tumbled, airflow at 100 liters per minute, 90% relative humidity and 22° C. was introduced to the vessel through a delivery line attached to an internal inlet. The airflow vented out of the vessel through a second delivery line and internal vent. Addition of moisture in this manner was continued for 200 to 240 minutes. Rotation of the vessel was stopped after the desired amount of water had been introduced. The airflow was stopped, and the inlet and outlet lines were sealed closed. The vessel was then maintained at a temperature of 50° C. for 24 hours. After the designated time the vessel was cooled to room temperature and the impregnated carbon removed.

Samples of the impregnated carbon were evaluated for moisture content and gas adsorption performance. Moisture content was determined with Test Method 1. Samples of the impregnated carbon were manufactured into a respirator filter, and performance against cyanogen chloride was determined by Test Method 2. Adsorption performance of an impregnated carbon for carbon tetrachloride was determined by using NIOSH respirator certification tests as required in the Code of Federal Regulations, Chapter 42 Part 84 Approval of Respiratory Protective Devices, for negative pressure respirator cartridges using Test Method 3. Results are given in Table 1.

COMPARATIVE EXAMPLE 1

Comparative Example 1 was the URC 12×30 product of Example 1, except this was tested in a condition as received from the vendor.

COMPARATIVE EXAMPLE 2

Comparative Example 2 was prepared in the same manner as Example 1 except that no water treatment was made.

Test Results

Test Data

TABLE 1

Gas Performance and Moisture Test Results

| Impregnant & Process | Carbon Tetrachloride | | Cyanogen Chloride | | Carbon Moisture (%) | |
|---|---|---|---|---|---|---|
| | Time (minutes) | Standard Deviation | Time (minutes) | Standard Deviation | Before Processing | After Processing |
| Comparative Example 1 (as supplied by vendor) | 41.9 | 4.9 | 4.0 | N/A | 6.75 | N/A |
| Comparative Example 2 (TEDA 1.5% No added water) | 38.5 | 7.7 | 74.3 | 3.6 | 7.01 | 6.77 |
| Example 1 (TEDA 1.5% Process 1) | 42.0 | 3.8 | 72.2 | 1.8 | 6.79 | 7.46 |
| Example 2 (TEDA 1.5% Process 2) | 44.7 | 4.6 | 73.9 | 3.5 | 6.70 | 7.11 |

TABLE 2

Comparison of Treated and Untreated Carbon

| Performance Test Breakthrough time-minutes: | Example 1 URC-TEDA 1.5% Time (standard deviation) | Comparative Example 1 Untreated URC Carbon Time (standard deviation) |
|---|---|---|
| Carbon Tetrachloride Not Prehumidified | 72.7 (3.5) | 77.5 (0.7) |
| Carbon Tetrachloride Prehumidified | 42.0 (3.8) | 41.9 (4.9) |

TABLE 2-continued

Comparison of Treated and Untreated Carbon

| Performance Test Breakthrough time-minutes: | Example 1 URC-TEDA 1.5% Time (standard deviation) | Comparative Example 1 Untreated URC Carbon Time (standard deviation) |
|---|---|---|
| Ammonia | 45.3 (3.0) | 46.0 (n/a) |
| Sulfur Dioxide | 80.0 (1.4) | 82.5 (6.4) |
| Cyanogen Chloride | 72.2 (1.8) | 4.0 (n/a) |

The results indicate that Process 1 and Process 2 successfully add TEDA in the presence of water to the carbon being impregnated. The addition of TEDA provides adsorptive performance against cyanogen chloride which is not present in the untreated carbon. The addition of TEDA and water does not cause significant degradation of the carbon performance against physically adsorbed organic compounds such as carbon tetrachloride. The addition of water by the methods of the invention does not wash off or otherwise compromise performance of the multiple other impregnants already present on the filter media particles. Yet the methods allow the water content to be maintained or increased, as desired. Advantageously, the presence of the water will help to provide protection against acid and ammonia gases, or the like. Meanwhile, the multiple other impregnants enhance performance of the filter media particles against other contaminant gases such as ammonia and sulfur dioxide, for example. The effectiveness of the carbon against these gases both before and after the subject process (Tables 1 and 2) demonstrates that the process does not affect the performance of those other impregnants.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of making a filter medium, comprising the steps of:
   (a) causing at least one solid, organic compound to sublime onto a plurality of filter media particles, wherein the solid, organic compound comprises TEDA; and
   (b) during at least a portion of said sublimation, causing a fluid impregnant to contact and be incorporated into the filter media particles via non-bulk contact.

2. The method of claim 1, wherein the weight ratio of the solid organic compound to the filter media particles is in the range from about 0.1:100 to about 10:100.

3. The method of claim 2, further comprising piperazine.

4. The method of claim 3, wherein the weight ratio of TEDA to piperazine is in the range from 1:20 to 20:1.

5. The method of claim 1, wherein the fluid comprises water and step (b) comprises non-bulk contacting the particles with 0.05 to 2 parts by weight water per 100 parts by weight of the particles.

6. The method of claim 5, wherein at least a portion of the water is in the form of steam.

7. The method of claim 5, wherein at least a portion of the water is in the form of an atomized spray.

8. The method of claim 5, wherein the water is caused to non-bulk contact the particles over a period from one minute to 120 minutes.

9. The method of claim 1, wherein at least a portion of steps (a) and (b) occurs under a vacuum.

10. The method of claim 1, wherein at least a portion of steps (a) and (b) occurs under a vacuum for a period of 2 hours to 48 hours.

11. The method of claim 1, wherein at least a portion of the filter media particles comprise at least one metal impregnant.

12. The method of claim 1, wherein at least a portion of the filter media particles comprise Cu, Zn, and Mo impregnants.

13. A method of making a filter medium, comprising the steps of:
   (a) intermixing a plurality of filter media particles with a plurality of solid TEDA particles to form a solid mixture;
   (b) heating the solid mixture under conditions effective to cause at least a portion of the TEDA to sublime onto the filter media particles; and
   (c) while heating the solid mixture, non-bulk contacting the particles with a fluid impregnant.

* * * * *

UNITED STATES PATENT AND TRADEMARK OFFICE
CERTIFICATE OF CORRECTION

PATENT NO. : 6,767,860 B2
DATED : July 27, 2004
INVENTOR(S) : Hern, Jamie A.

It is certified that error appears in the above-identified patent and that said Letters Patent is hereby corrected as shown below:

Column 2,
Line 8, delete "arc" and insert therefore -- are --.
Line 23, after "War II" insert -- , --.

Column 4,
Line 51, delete "fill" and insert therefore -- full --.
Line 66, delete "non-imnmersive" and insert therefore -- non-immersive --.

Column 5,
Line 20, after "contact" insert -- . --.

Column 12,
Line 45, delete "Chernical" and insert therefore -- Chemical --.

Signed and Sealed this

Seventh Day of December, 2004

JON W. DUDAS
*Director of the United States Patent and Trademark Office*